US010893142B1

(12) United States Patent
Burton et al.

(10) Patent No.: US 10,893,142 B1
(45) Date of Patent: Jan. 12, 2021

(54) CONTACT CENTER AUTHENTICATION

(71) Applicant: Eckoh UK Limited, Hemel Hempstead (GB)

(72) Inventors: Ashley Burton, Watford (GB); Cameron Peter Sutherland Ross, St. Albans (GB); James Heath, Hove (GB); Steven James Butler, Berkhamsted (GB)

(73) Assignee: Eckoh UK Limited, Hemel Hempstead (GB)

(*) Notice: Subject to any disclaimer, the term of this patent is extended or adjusted under 35 U.S.C. 154(b) by 0 days.

(21) Appl. No.: 16/745,655

(22) Filed: Jan. 17, 2020

(30) Foreign Application Priority Data

Nov. 20, 2019 (GB) .................................. 1916908.5

(51) Int. Cl.
*H04M 3/00* (2006.01)
*H04M 5/00* (2006.01)
(Continued)

(52) U.S. Cl.
CPC ........ *H04M 3/5175* (2013.01); *G06F 21/313* (2013.01); *G06Q 30/018* (2013.01); *H04M 3/5183* (2013.01)

(58) Field of Classification Search
CPC ............. H04M 3/5175; H04M 3/5158; H04M 3/5183; H04M 3/523; H04M 3/5133; H04M 3/5191; H04M 3/5231; H04M 3/51; H04M 3/42382; H04M 3/5141; H04M 3/5235; H04M 3/42102; H04M 3/5233; H04M 1/72552; H04M 2201/42; H04M 3/2218; H04M 3/42042; H04M 3/42059;
(Continued)

(56) References Cited

U.S. PATENT DOCUMENTS 6,252,947 B1 * 6/2001 Diamond ............... G11B 31/00
379/88.09
6,324,271 B1 11/2001 Sawyer et al.
(Continued)

FOREIGN PATENT DOCUMENTS

CA          3050566 A1    10/2019
WO      WO 01/44940 A1    6/2001
WO    WO 2019/179728 A1   9/2019

*Primary Examiner* — Ahmad F. Matar
*Assistant Examiner* — Kharye Pope
(74) *Attorney, Agent, or Firm* — Blank Rome LLP

(57) ABSTRACT

A method of authenticating a service agent on behalf of a user, the method performed at a server and including: obtaining a unique identifier associated with a first communication session established over a first communication channel; storing the unique identifier in a data store; receiving, via a second communication channel, a validation request comprising verification information associated with the user; attempting authentication of the service agent by comparing the verification information with the unique identifier, and in response outputting a validation response via the second communication channel. If the verification information corresponds with the unique identifier, the validation response indicates successful authentication of the service agent, and if the verification information does not correspond with the at least one unique identifier, the validation response indicates unsuccessful authentication of the service agent.

17 Claims, 6 Drawing Sheets

(51) Int. Cl.
*H04M 3/51* (2006.01)
*G06Q 30/00* (2012.01)
*G06F 21/31* (2013.01)
*H04L 12/66* (2006.01)

(58) Field of Classification Search
CPC ............ H04M 7/0045; H04M 7/0048; H04M 7/0054; H04M 2203/551; H04M 2203/651; H04L 65/1083; H04L 65/1069; H04L 51/046; H04L 41/0681; H04L 63/08; H04L 67/146; H04Q 2213/13139; H04Q 2213/13515
USPC .............................................. 379/265, 266.07
See application file for complete search history.

(56) References Cited

U.S. PATENT DOCUMENTS

| | | | |
|---|---|---|---|
| 7,089,310 B1 | 8/2006 | Ellerman et al. | |
| 8,213,581 B1 | 7/2012 | Brahm et al. | |
| 8,549,594 B2 | 10/2013 | Lin | |
| 9,001,977 B1 | 4/2015 | Ramalingam et al. | |
| 9,549,062 B1* | 1/2017 | Yaung | H04M 1/665 |
| 9,654,976 B2 | 5/2017 | Feltham et al. | |
| 9,942,752 B1 | 4/2018 | Marimuthu | |
| 10,523,708 B1* | 12/2019 | Ilincic | H04W 12/06 |
| 2006/0206709 A1* | 9/2006 | Labrou | H04L 63/083 713/167 |
| 2006/0229054 A1* | 10/2006 | Erola | H04M 3/51 455/403 |
| 2007/0178843 A1* | 8/2007 | Singh | H04W 24/00 455/67.11 |
| 2008/0051066 A1* | 2/2008 | Bandhole | H04M 3/436 455/413 |
| 2009/0305670 A1* | 12/2009 | DeBoer | G06Q 20/40 455/411 |
| 2011/0066891 A1* | 3/2011 | Wechsler | G06F 16/2308 714/37 |
| 2012/0144198 A1* | 6/2012 | Har | H04L 63/0884 713/170 |
| 2013/0218947 A1* | 8/2013 | Zur | G06Q 10/06 709/203 |
| 2014/0369485 A1* | 12/2014 | Hollander | H04M 3/5166 379/265.02 |
| 2015/0094026 A1 | 4/2015 | Martin | |
| 2015/0170236 A1 | 6/2015 | O'Connor et al. | |
| 2015/0264023 A1* | 9/2015 | Reno | H04L 63/08 726/7 |
| 2016/0352894 A1* | 12/2016 | Mulay | H04M 3/5158 |
| 2017/0104876 A1* | 4/2017 | Hibbard | H04M 3/52 |
| 2017/0142087 A1* | 5/2017 | Maninder | H04L 9/32 |
| 2017/0318152 A1* | 11/2017 | Chen | H04M 3/42068 |
| 2018/0084111 A1* | 3/2018 | Pirat | H04M 3/5166 |

\* cited by examiner

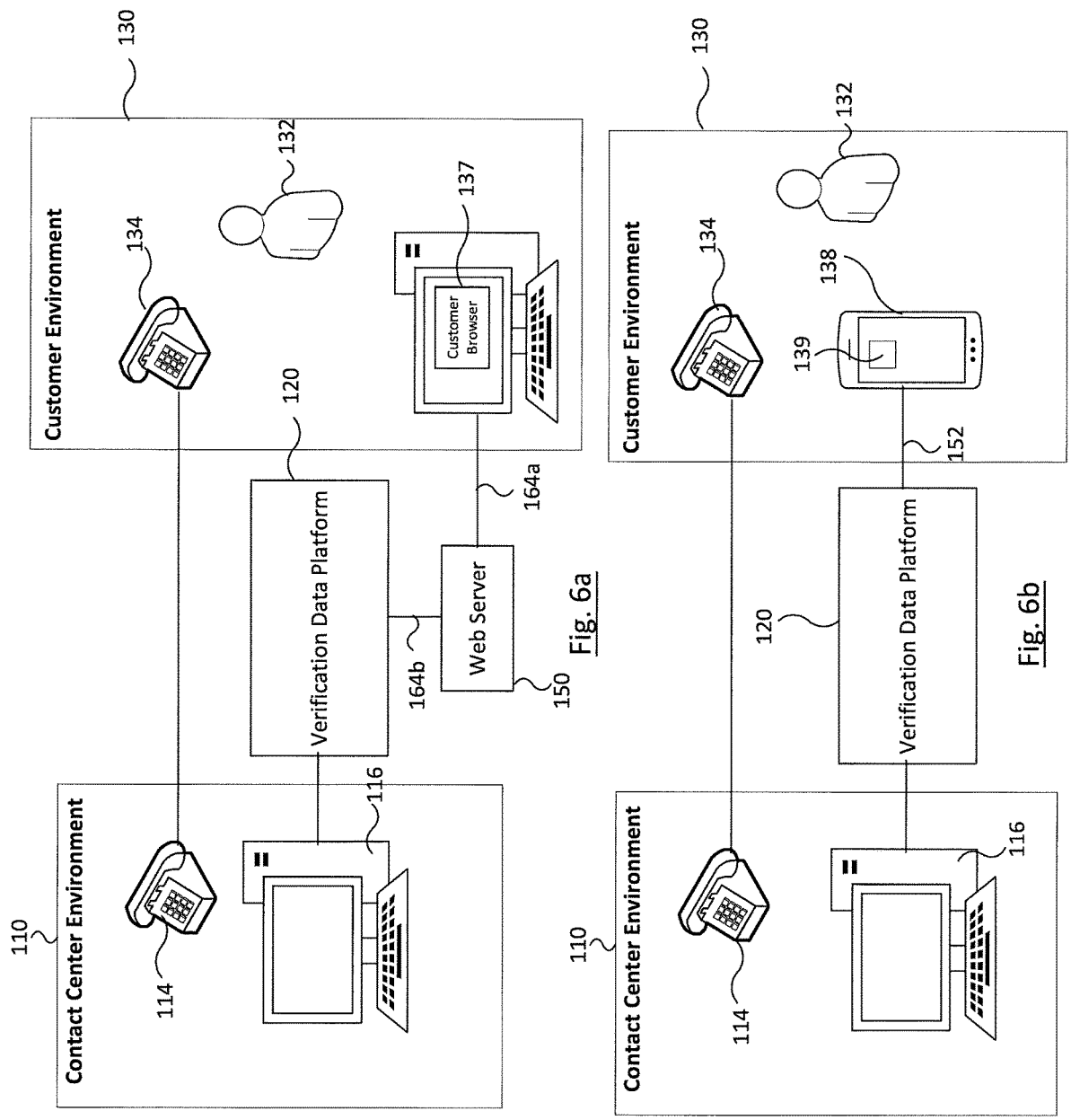

CONTACT CENTER AUTHENTICATION

FIELD OF THE INVENTION

The present invention relates to a method and system for authentication of a caller, in particular, a method and system for authenticating a contact center service agent who has made contact with an individual.

BACKGROUND OF THE INVENTION

Contact centers, working on behalf of customer-facing businesses, are often required to make calls to customers in order to carry out a range of customer service tasks. The customer is known to the contact center through their customer database, but it is vital for data protection and fraud prevention purposes to ensure that the call is being made between a representative of the business (such as a contact center working on behalf of the business) and the intended customer. Given the often unsolicited nature of these calls, the customer may be reluctant to provide their information to the contact center without any method of verifying the authenticity of the call. This can result in a phone call being terminated without the contact center agent achieving the desired outcome.

In recent years, there has been an increase in instances of fraud carried out by criminals who pose as a legitimate business in order to obtain personal and financial information from a customer via a telephone call. A customer who has received an unsolicited phone call, purported to be from a business, could benefit from the proposed invention by enabling them to validate the authenticity of the received call. Legitimate businesses who utilize the solution would encourage their customers to validate all calls received.

There are a number of methods currently in place for the authentication of an individual who has made contact with a business. Typical authentication methods used by contact center operators include asking the customer to confirm personal details, a password or some other personal secret which has been shared with the contact center operator in the past.

Contact centers may use the caller line identification (CLI, or number from which the customer is calling), to partially authenticate the customer. Contact centers may also use voice biometrics to check whether the current caller's voice profile matches that sampled during previous interactions. To do so requires an initial 'registration' process on the initial call with a customer.

There are limited options available for a customer to validate a business who has made an unsolicited call. The typical solution is for the service agent to request the customer calls a publicly known telephone number for the business and terminating the original call.

SUMMARY OF THE INVENTION

The inventors have identified that when an organization makes an outbound call to a customer, the recipient has no means of being certain that it is the organization in question or a fraudster attempting to steal their details. Thus, agents who are making outbound calls often face reluctant customers, who are unwilling to answer customer validation questions for unsolicited calls. This can increase the length of time of a call making inefficient use of communication network resources.

Resolution of customer contact is of primary importance to contact centers and the businesses who utilize their services. Where a customer does not have confidence in the authenticity of a contact they have received, it is highly likely that the purpose of the contact will not be completed as it will rely on the customer commencing a new communication with the contact center through publicly known means. This causes an increase in data transmitted over communication networks and a potential cost to the customer in making the phone call.

Embodiments of the invention utilize the trusted platforms which are made available to the customer (such as website and mobile device applications) to enable the validation of a telephone call made by a service agent in a contact center representing the business. Thus, embodiments described herein enable a customer to validate a caller (a service agent) and end calls which are not verified, preventing fraud.

According to one aspect of the present disclosure there is provided a method of authenticating a service agent on behalf of a user, the method performed at least one server and comprising: obtaining at least one unique identifier associated with a first communication session between the service agent and the user, the first communication session established over a first communication channel; storing the at least one unique identifier in a data store; receiving, via a second communication channel, a validation request comprising verification information associated with the user; attempting authentication of the service agent by comparing the verification information with the at least one unique identifier stored in the data store, and in response outputting a validation response via the second communication channel; wherein if the verification information corresponds with the at least one unique identifier stored in the data store the validation response indicates successful authentication of the service agent, and if the verification information does not correspond with the at least one unique identifier stored in the data store the validation response indicates unsuccessful authentication of the service agent.

The first communication session may be initiated by a telephone associated with the service agent.

The first communication session may be initiated by a computing device associated with the service agent.

The validation request may be received from a web server hosting a website of a merchant that is associated with the service agent, the verification information entered into the website by the user.

The validation request may be received from a web server hosting a website of a merchant that is associated with the service agent, the verification information having been obtained by the web server by querying a database server in response to the user logging to into the website.

The validation response may be output to the webserver for displaying a message on the website conveying the successful authentication of the service agent.

The validation request may be received from an application of a merchant that is associated with the service agent installed on a computing device associated with the user.

The validation response may be output to the computing device associated with the user.

The first communication session between the service agent and the user may be routed via the at least one server, and the method may comprise obtaining the at least one unique identifier by analysing data exchanged in the first communication session.

Obtaining the at least one unique identifier may comprise receiving the at least one unique identifier from a computing device associated with the service agent.

The unique identifier may comprise at least one of: (i) a telephony session identifier assigned to the first communication session; (ii) a timestamp indicating when the first communication session was established; (iii) a phone number associated with the user; (iv) information associated with the service agent; (v) information associated with the device used to initiate the first communication session; and (vi) information entered manually by the service agent.

The unique identifier may comprise an alphanumeric code.

The validation response may comprise one or more of: information associated with the service agent, a time when the first communication session was established, and a duration of the first communication session.

The first communication session may be a voice call.

The second communication channel may be over a packet-based network.

According to another aspect of the present disclosure there is provided a computer program product for authenticating a service agent on behalf of a user, the computer program product comprising instructions embodied on a non-transient computer-readable medium and configured so as when executed on a processor of at least one server to perform the method of any preceding claim.

The instructions (code) may be provided on a carrier such as a disk, CD- or DVD-ROM, programmed memory such as read-only memory (Firmware), or on a data carrier such as an optical or electrical signal carrier. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

According to another aspect of the present disclosure there is provided a server for authenticating a service agent on behalf of a user, the server comprising a processing apparatus configured to:
  obtain at least one unique identifier associated with a first communication session between the service agent and the user, the first communication session established over a first communication channel;
  store the at least one unique identifier in a data store;
  receive, via a second communication channel, a validation request comprising verification information associated with the user;
  attempt authentication of the service agent by comparing the verification information with the at least one unique identifier stored in the data store, and in response output a validation response via the second communication channel;
  wherein if the verification information corresponds with the at least one unique identifier stored in the data store the validation response indicates successful authentication of the service agent, and if the verification information does not correspond with the at least one unique identifier stored in the data store the validation response indicates unsuccessful authentication of the service agent.

These and other aspects will be apparent from the embodiments described in the following. The scope of the present disclosure is not intended to be limited by this summary nor to implementations that necessarily solve any or all of the disadvantages noted.

BRIEF DESCRIPTION OF DRAWINGS

For a better understanding of the present subject matter and to show how the same may be carried into effect, reference will now be made by way of example to the accompanying drawings in which:

FIGS. 6*a* and 6*b* illustrate an example whereby a communication session between a service agent and a customer is routed externally to a central server.

DETAILED DESCRIPTION

Specific embodiments will now be described, by way of example only.

Figure 1:
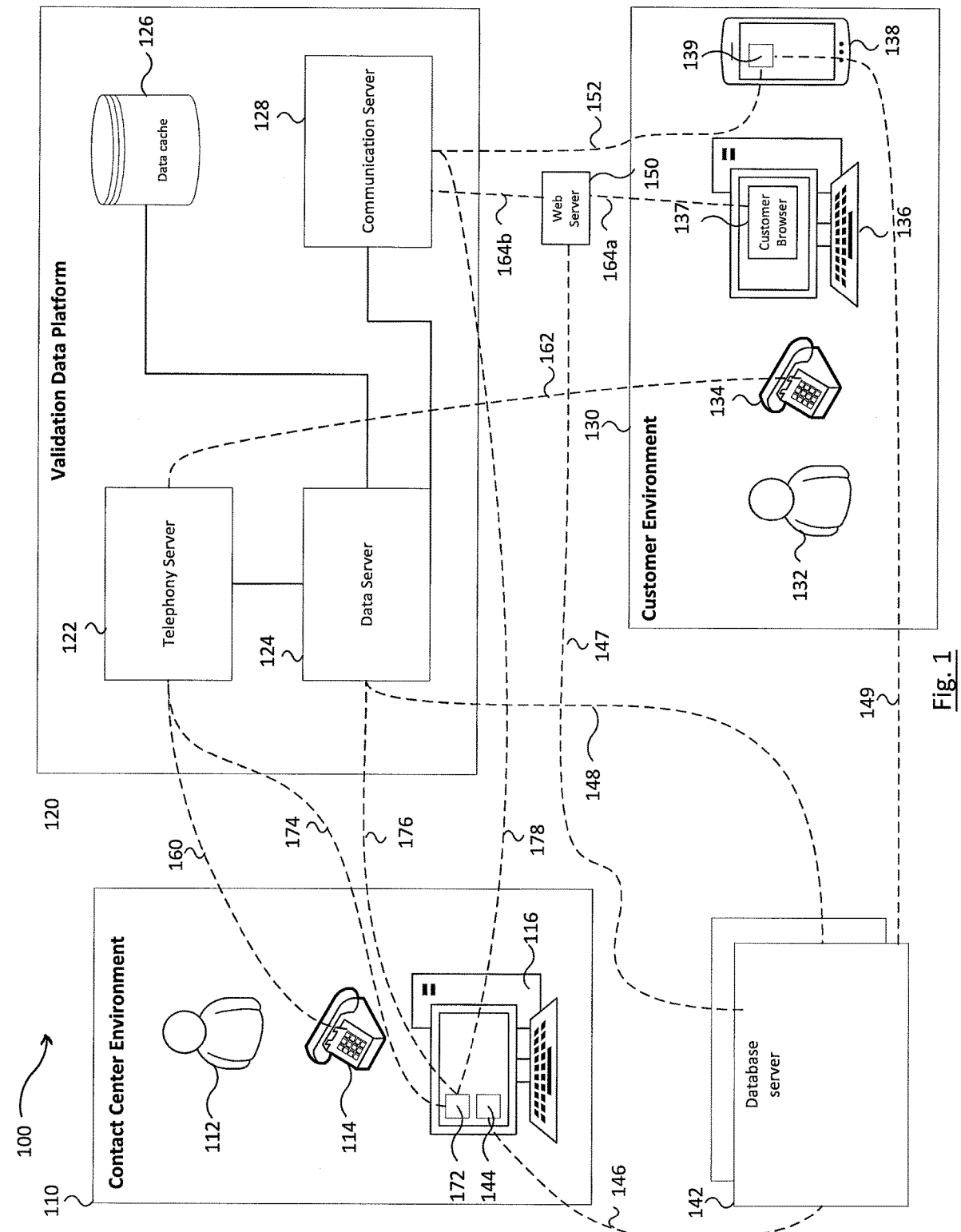
FIG. 1 shows a schematic block diagram of a system in which a customer communicates with a contact center over a telephone call, according to one described embodiment.

FIG. 1 shows a schematic diagram of a system 100 in which contact center agent 112 (also referred to herein as a service agent) in a merchant's contact center 110 having an agent communications device 114 wishes to be connected to a customer communications device 134 of a customer 132, to discuss customer 132's account with a company (merchant). The term 'customer' is used herein to refer to a person who has a pre-existing relationship with the company (merchant). The merchant may for example be a bank, retailer, insurance provider, hospitality service provider, utility provider etc., and the contact center agent 112 places calls to customers of the merchant on behalf of the merchant.

As shown in FIG. 1, in the contact center 110 a service agent 112 has a communications device 114 (e.g. a telephone) and a computing device 116 executing a customer relationship management (CRM) application 144 and a computer telephony integration (CTI) application 172, see below.

The service agent 112 may be a person located in the contact center 110. Alternatively, the role of the service agent may be fulfilled, partly or completely, by an autonomous or semi-autonomous process executed on the computer 116 or elsewhere in the contact center 110, or outside the contact center 110. Such autonomous or semi-autonomous approaches, such as using Interactive Voice Response (IVR), are well known to those skilled in the art, and may allow contact centers to deploy center agent resources more efficiently, to improve customer service, or reduce cost.

Agent 112, having computing device 116, shall be able to utilize CTI application 172 and CRM application 144 as further outlined below.

FIG. 1 also shows a validation data platform (VDP) 120 comprising a data server 124, a telephony server 122, a communication server 128, and a data cache 126. As shown in FIG. 1, the data server 124 is coupled to the telephony server 122, the communication server 128 and the data cache 126. The VDP 120 is operated by, or on behalf of, the merchant. While each of these servers is shown as a single entity in FIG. 1 and referred to herein, it will be appreciated that a single server may perform the operations described herein with reference to these plurality of servers. Similarly, it will be appreciated that while a single data cache 126 is shown in FIG. 1, multiple data caches may be provided.

As shown in FIG. 1, the data server 124, telephony server 122, communication server 128 and data cache 126 are shown as separate and distinct devices, though it will be appreciated that the functionality of one or more of these devices may be incorporated within one or more of the other devices.

The customer 132 will have a telephony device with the capability of receiving telephone calls. This is shown in FIG. 1 as customer communications device 134.

As shown in FIG. 1, the customer 132 may also be associated with a computing device 136 executing a browser 137 via which web content can be displayed. The customer computing device 136 may be a PC, mobile telephone 138, laptop, tablet or any other computing device able to connect to the VDP 120. It will be appreciated that while both the customer communications device 134 and customer computing device 136 are shown in FIG. 1, the customer communications device 134 may execute the browser 137 and the customer computing device 136 may not be present.

As shown in in FIG. 1, additionally or alternatively, the customer 132 may be associated with a mobile device 138 running a software application 139 (otherwise referred to herein as a customer application) made available by the merchant. The mobile device 138 may be a mobile telephone, laptop, tablet, a home 'smart assistant' such as an Amazon Alexa® or Google Home™ device, or any other mobile computing device able to connect to the VDP 120. It will be appreciated that while both the customer communications device 134 and mobile device 138 are shown in FIG. 1, the customer communications device 134 may run the software application 139 and the mobile device 138 may not be present.

In embodiments whereby the customer browser 137 is used, the customer browser establishes a connection 164a to a web server 150 that hosts a website of the merchant. That is, the web server 150 is configured to serve a webpage of a website of the merchant for display in the customer browser 137. The web server 150 is further configured to communicate data to, and receive information from, the VDP 120 (in particular the communication server 128) via connection 164b. This is described in further detail below. Connections 164a and 164b may be via a packet-based network (e.g. the Internet).

It will be appreciated that while a single web server is shown in FIG. 1 for simplicity, the web server 150 may be implemented by multiple web servers.

The web server 150 may also be connected to a database server 142 through connection 147. This enables the web server 150 to access personal data of the customer 132 that is stored in a database server 142 and supply this to the VDP 120. The CRM application 144 is connected to the database server 142 through connection 146. Connection 147 may be via a packet-based network (e.g. the Internet).

In embodiments whereby the customer application 139 is used, the customer application has a communication channel 152 to the VDP 120 (in particular the communication server 128) which enables the customer application 139 to communicate data to, and receive data from, the VDP 120. The communication channel 152 may be over a PSTN network, cellular network, and/or a packet based network (e.g. the Internet).

The customer application 139 may also establish a communication channel 149 to the database server 142. This enables the customer application 139 to access personal data of the customer 132 that is stored in a database server 142 and supply this to the VDP 120. Connection 149 may be via a packet-based network (e.g. the Internet).

The data server 124 is coupled to the merchant's database server 142 via connection 148 which stores customer information held by the merchant. Connection 148 may be via a packet-based network (e.g. the Internet or via an internal network) or other connection method. Data held on the database server 142 is accessible by the customer 132 through their browser 137 or customer application 139 once they have logged into their account with the merchant, this is described in more detail below. Database server 142 may comprise a single database or multiple databases.

As noted above, the agent computing device 116 may execute a CRM application 144. The CRM application 144 enables the agent 112 to access personal data of the customer 132 that is stored in a database server 142. The CRM application 144 is connected to the database server 142 through connection 146. Connection 146 may be via a packet-based network such as the internet or via an internal network.

In order to place a call to a customer the service agent 112 may use the agent's communications device 114, which may be a telephone, which can communicate with the telephony server 122 via a communication channel 160 which may be over a PSTN network, cellular network, and/or a packet based network (e.g. the Internet) in the case of a Voice over Internet Protocol (VOIP) call. That is, the agent computing device 116 may not be present.

As noted above, the agent computing device 116 may execute CTI application 172 to enable direct communication between the agent computing device 116 and the telephony server 122 (through communication channel 174), to the data server 124 (through connection 176) and the communication server 128 (through connection 178). The agent 112 may use a headset coupled to the agent computing device 116 to communicate with the customer. That is, an agent's communications device 114 may not be present. Connection 174 may be in place alongside, or in addition to connection 160. Connections 174, 176, and 178 may be via the internet or via an internal network and may be individual connections or one connection.

Connection 160 enables an outbound phone call to be made from agent phone 114 to the telephony server 122. Connection 162 enables a further communication channel to be established between the telephony server 122 and the customer communications device 134. Connections 160 and 162 may be individual connections, with the telephone server 122 receiving connection 160 prior to commencing 162 (whether automatically of through some manual process), or connections 160 and 162 could be the same communication channel, with telephony server 122 receiving a second stream of connection 160, or the telephony server could be a server processing the combined connection 160/162. The connection 162 may be over a PSTN network, cellular network, and/or a packet based network (e.g. the Internet) in the case of a Voice over Internet Protocol (VOIP) call.

Figure 2:
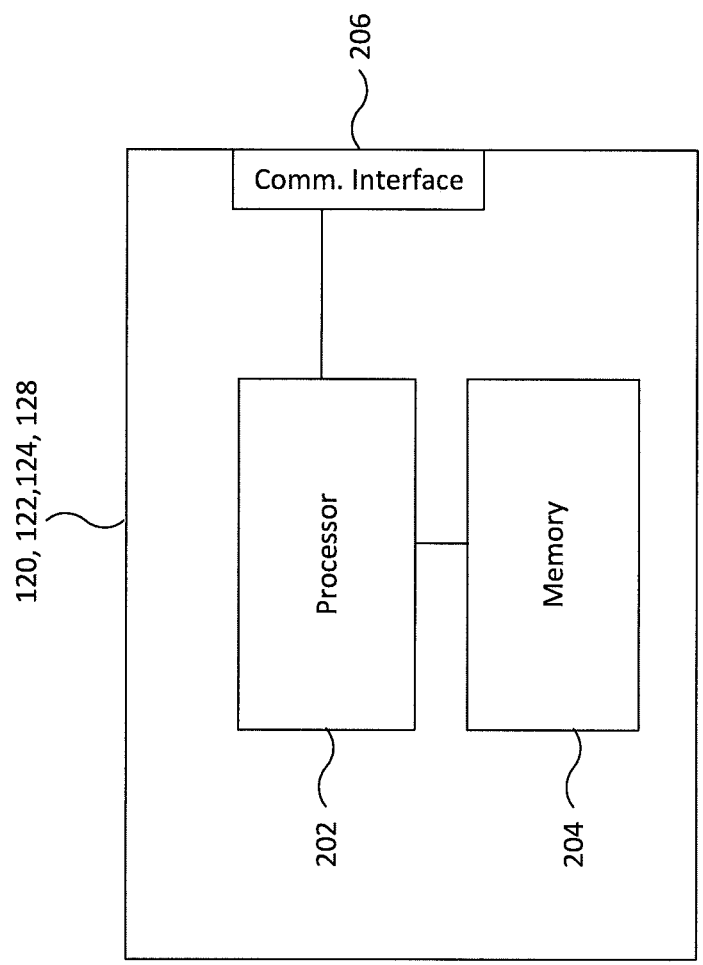
FIG. 2 shows a schematic block diagram of a server in the system of FIG. 1.

The server shown in FIG. 2 may for example correspond to one of the data server 124, telephony server 122, and the communication server 128 described herein. Alternatively, the server shown in FIG. 2 may for example correspond to a single server comprising the functionality of the data server 124, telephony server 122, and the communication server 128 described herein.

The functionality of the server may be implemented in code (software) stored on a memory (e.g. memory 204) comprising one or more storage media, and arranged for execution on the processor 202 comprising on or more processing units. The code is configured so as when fetched from the memory 204 and executed on the processor 202 to perform operations in line with embodiments discussed herein. Alternatively, it is not excluded that some or all of the functionality of the server is implemented in dedicated hardware circuitry, or configurable hardware circuitry like an FPGA. As shown in FIG. 2, the server comprises at least one communication interface 206 for communicating with components of the system 100.

Figure 3:
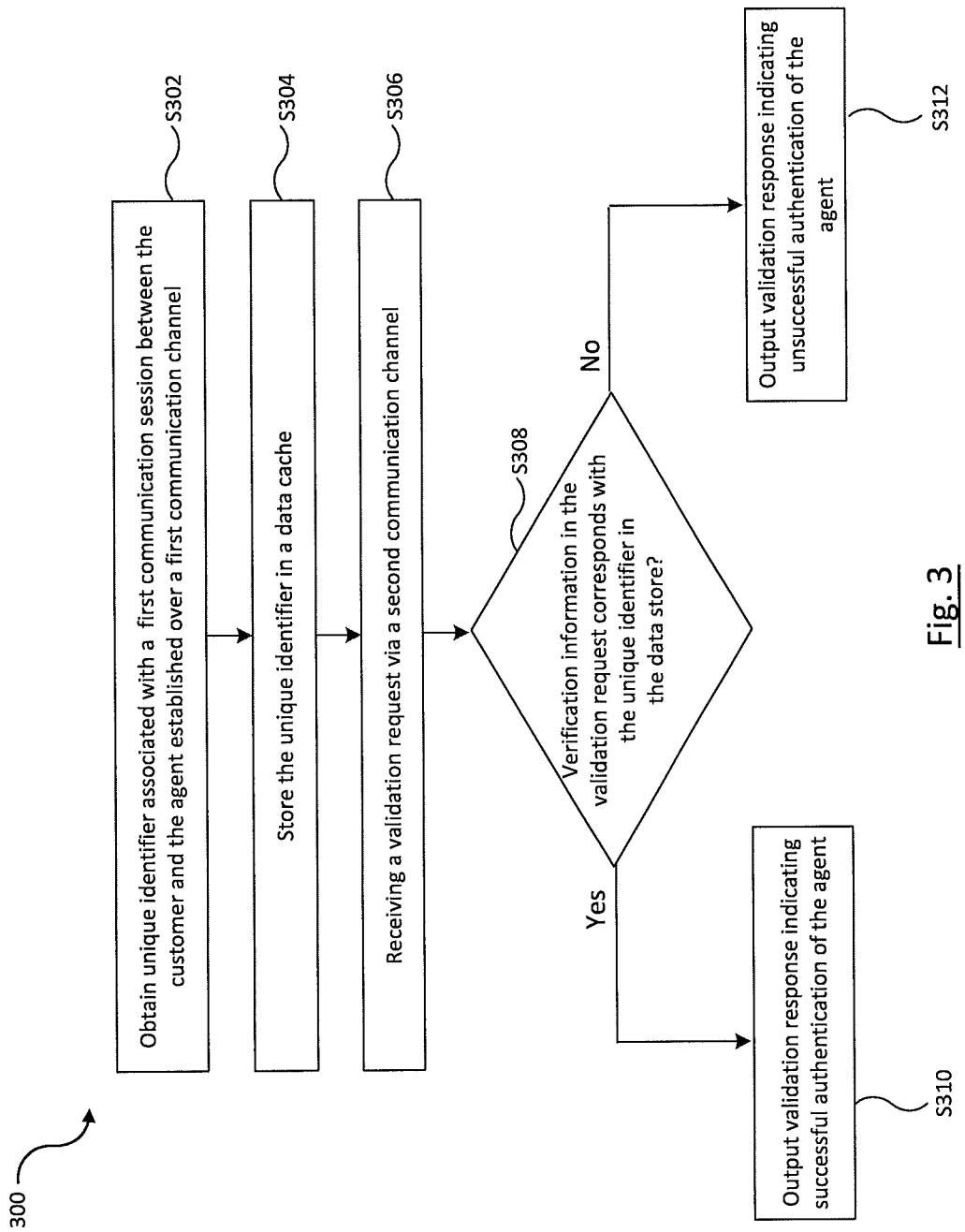
FIG. 3 illustrates a flowchart of a process performed in embodiments of the present invention.

FIG. 3 is a flowchart of a process 300 performed by components of the VDP 120.

The steps shown separately in FIG. 3 may or may not be implemented as separate steps, and may or may not be implemented in the order shown.

At step, S302 the VDP 120 obtains a unique identifier associated with a first communication session (e.g. a voice or video call) between the customer 132 and the service agent 112 which is established over a first communication channel. Step S302 may be performed in various ways.

In some embodiments, the first communication session between the service agent 112 and the customer 132 is routed via VDP 120, and the VDP 120 performs step S302 by analysing data exchanged in the first communication session. In these embodiments, the telephony server 122 establishes the first communication session with the agent 112. For example, the agent 112 places a call to the customer 132 using their communications device 114 which gets directed over the communications channel 160 to the telephony server 122 on the VDP 120. The telephony server 122 answers the call and makes a further communication via connection 162 to customer communications device 134. The establishment of the first communication session may be initiated by the communications device 114 or by the telephony server 122 (whereby the telephone server 122 is configured to set-up the calls in an automatic fashion on behalf of the agent 112 in a manner known in the art so that the agent 112 does not need to dial the phone numbers of the call recipients). As stated previously, connections 160 and 162 could be the same communication channel, with telephony server 122 receiving a second stream of connection 160, or the telephony server could be a server processing the combined connection 160/162. It will be appreciated that CTI application 172, or such other application utilized by agent 112, may be used for the establishment of a telephone call via the agent computing device 116.

The telephony server 122 then determines a unique identifier associated with the first communication session based on the first communication session being routed via the VDP 120. This unique identifier uniquely identifies the call session in progress with customer 132. It will be appreciated that this unique identifier may include one or more data items and may take various forms, including:

- A telephony session identifier; as is known in the art a telephony session identifier is assigned by the telephony hardware (e.g. the telephony server 122) to the first communication session which persists for the lifetime of the call;
- A timestamp indicating a time when the first communication session was established;
- A phone number of the customer's communications device 134;
- A channel number; the telephony server 122 may provide a fixed number of telephone lines (e.g. 5000) each associated with a channel number (1-5000) and the unique identifier may be the channel number (e.g. 3000) of the telephone line used to establish the first communication session;
- Details of the agent 112 based on unique identifiers of the agent used on the merchant's internal telephony network e.g. name, employee number etc.;
- Details of the agent's communications device 114 based on unique identifiers of the device, such as an extension number, used on the merchant's internal telephony network;
- An alphanumeric code that has been associated with the first communication session. This alphanumeric code could be generated by the VDP 120. Alternatively, in embodiments whereby the CTI application 172 is linked to the data server 124 the alphanumeric code could be selected by the agent. The alphanumeric code may for example comprise one or more letters and/or numbers.

It will be appreciated that the above are merely examples of the unique identifier and embodiments extend to any other identifier that is able to uniquely identify the first communication session.

The telephony server 122 notifies the data server 124 of the establishment of the first communication session and sends the unique identifier to the data server 124.

Figure 4A:
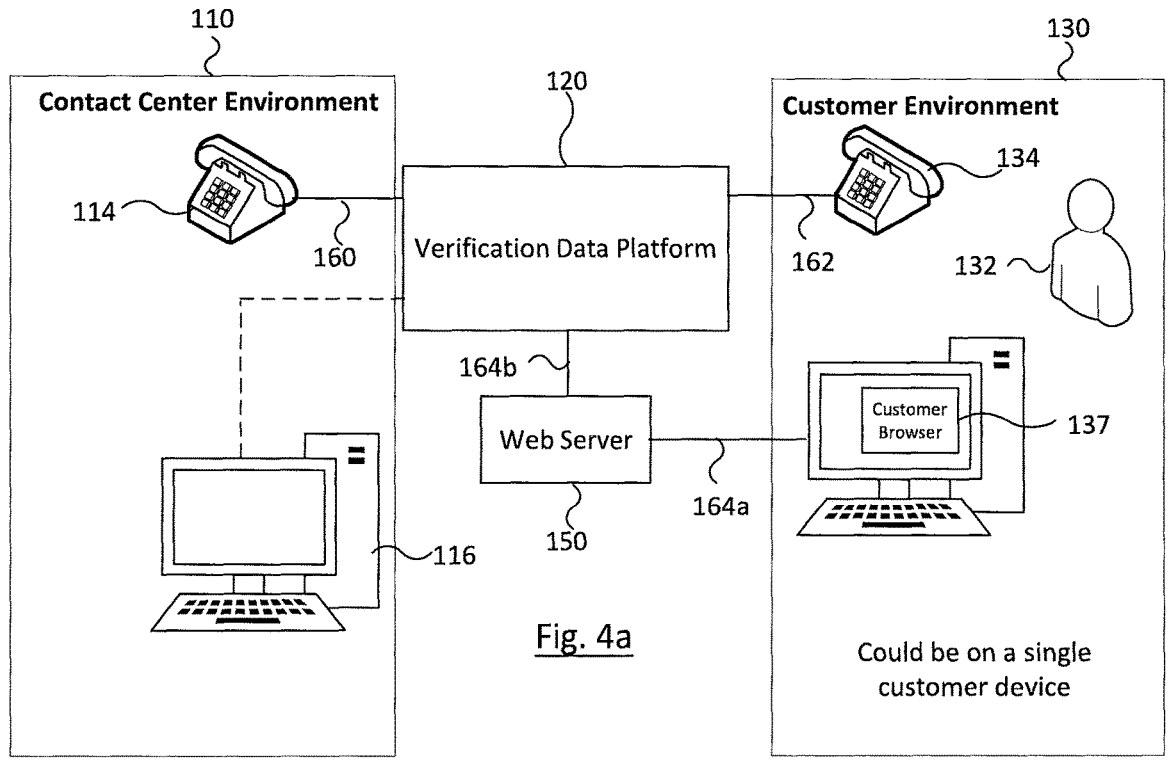
FIGS. 4*a* and 4*b* illustrate an example whereby a communication session between a service agent and a customer is routed via a central server.
Figure 4B:
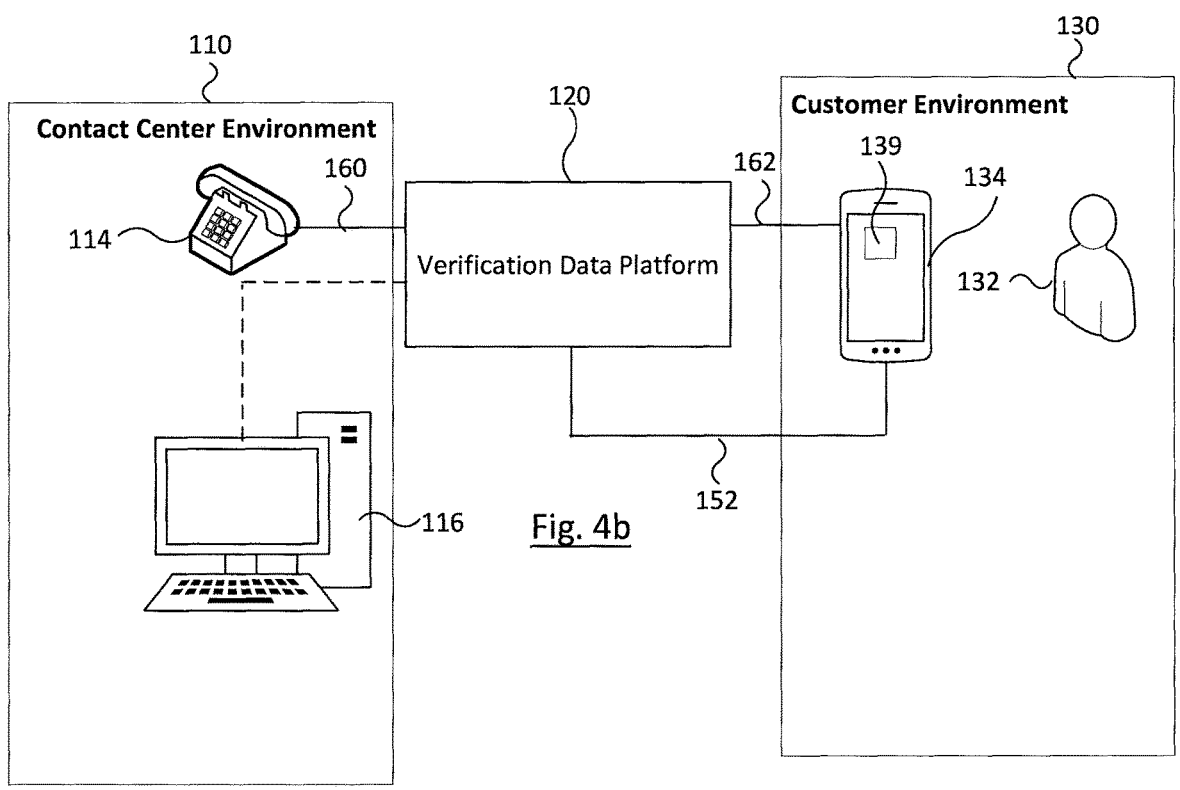

FIG. 4a and FIG. 4b illustrate example implementations in which the first communication session between the service agent 112 and the customer 132 is routed via VDP 120.

In other embodiments, the first communication session between the service agent 112 and the customer 132 is not routed via VDP 120. In these embodiments, at step S302 the agent 112 makes a direct call to the customer 132 (e.g. using agent communications device 114 or CTI application 172) without unique identifiers being automatically recorded by the telephony server 122. The agent 112, utilising CTI application 172, would then manually enter the unique identifier(s) for transmission from the CTI application 172 directly to the data server 124 via connection 176, to be stored in the data cache 126 for future validation.

FIG. 6a and FIG. 6b illustrate example implementations in which the first communication session between the service agent 112 and the customer 132 is not routed via VDP 120.

In response to the data server 124 being notified of the establishment of the first communication session, at step S304 the data server 124 transfers the unique identifier to the data cache 126. All information relating to the first communication will be recorded as associated data in the data cache 126.

In an embodiment, the agent 112 utilizing CTI application 172 may link the CTI application 172 to the data server 124 by inputting certain information which is received from the telephony server 122. This may, for example, take the form of:

- the agent 112 entering the phone number of the customer's communication device 134;
- the agent 112 entering unique information relating to the agent communications device 114, which has been received by the telephony server, which may or may not be entered manually by the agent or associated with their account on CTI application 172, and may or may not occur automatically.

It will be appreciated that the above are merely examples of the methods of linking CTI application 172 and data server 124 and may occur by validating any information which is processed by the telephony server 122, whether automatically or manually.

The linking of the CTI application 172 to the data server 124 enables the agent communications device 114 to see details linked to the customer call which is also linked to the VDP 120 to enables both dynamic validation to occur (described in more detail below with reference to step S308) and also validation of the customer's identity (also described in more detail below).

At step S306, the VDP 120 receives, via a second communication channel, a validation request comprising verification information associated with the customer 132. The second communication channel is different to the first communication channel.

In some embodiments, the validation request is received from the web server 150 hosting the website of the merchant. In these embodiments, if the customer 132 queries the authenticity of the agent 112 then the agent 112 can direct (e.g. verbally) the customer to a webpage of a website. For the purposes of fraud prevention, this website could be the homepage of the merchant, but this could also be any other website, including a central authentication website. In these embodiments it is the customer that determines the right website to access (rather than them clicking on a link sent to them in a SMS, which could be fraudulent).

Figure 5B:
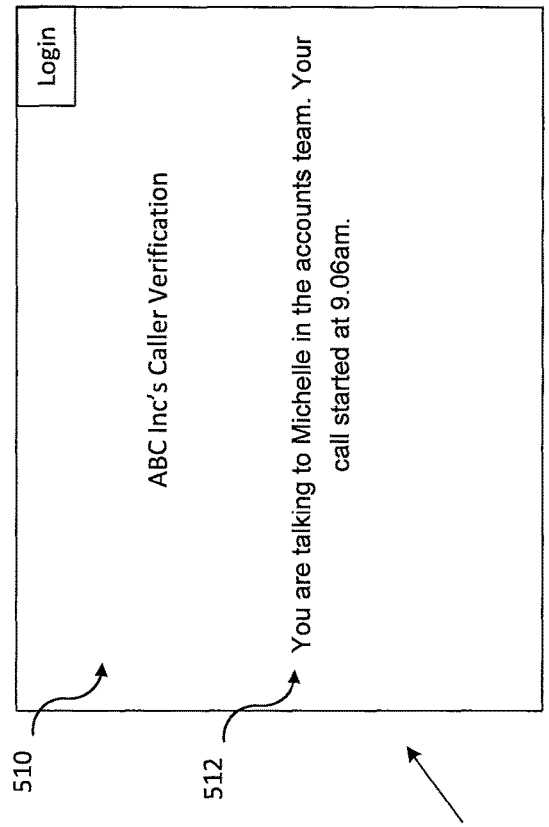
FIG. 5*a-c* illustrate example webpages displayed to a user in one embodiment of the present invention.
Figure 5C:
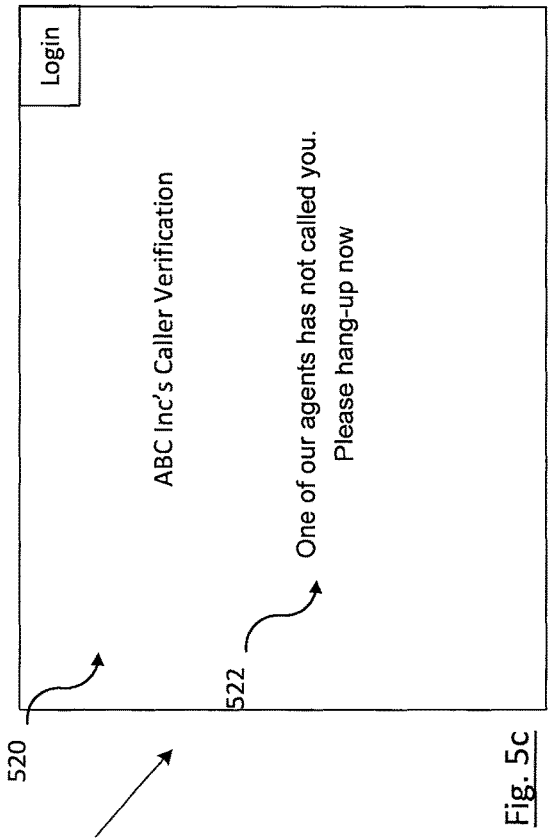
Figure 5A:
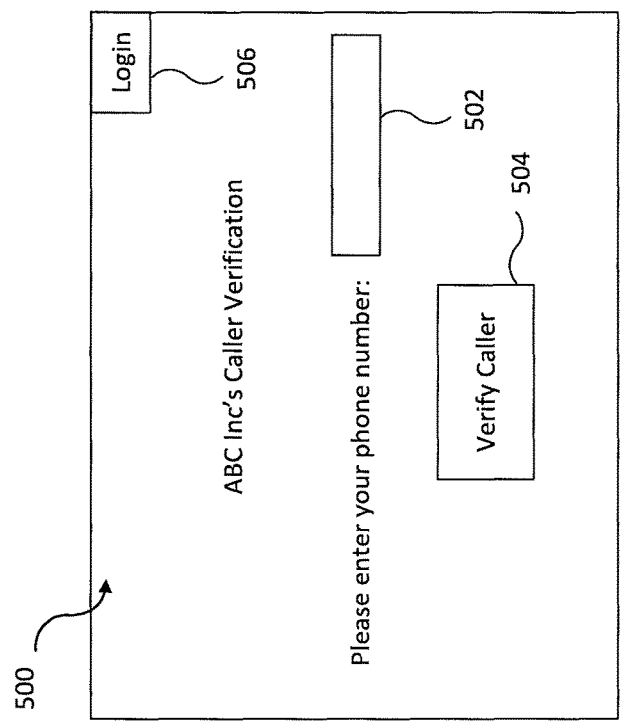

FIG. 5a illustrates an example webpage 500 of a website of a merchant, ABC Inc.

In one example, the webpage 500 allows the user to enter verification information (e.g. a phone number associated with their communications device 134) in an entry field 502 and then select a button 504 which causes the transmission of the verification information to the web server 150 (e.g. via connection 164a). The web server 150 then transmits a validation request (comprising the verification information that was entered into the webpage by the customer 132) to the communication server 128. That is, the customer 132, utilising browser 137 on customer computing device 136, commences a second communication session, with the communication server 128. In another example, the user selects a login button 506 on the webpage and accesses their account with the merchant by entering in login credentials. The web server 150 can then supply the login credentials to the database server 142 (via connection 147) which uniquely identify the customer 132. In response, the database server 142 may return verification information stored in the database server 142 that is associated with the customer 132 (via connection 147) to the web server 150. In this example, the verification information in the validation request received from the web server is obtained by the web server 150 from the database server 142 and thus the customer 132 is not required to enter the verification information.

In other embodiments, the validation request is received from the customer application 139. In these embodiments, if the customer 132 queries the authenticity of the agent 112 then the agent 112 can direct (e.g. verbally) the customer to launch the customer application 139. For example, the agent 112 could send a push notification to the customer 132 requesting that they access the customer application 139 (this push notification could be sent via the VDP 120 or via a communication channel external to the VDP 120). In one example, the customer application 139 allows the user to enter verification information via the graphical user interface of the customer application 139. The customer application 139 then transmits a validation request (comprising the verification information that was entered into the application by the customer 132) to the communication server 128 (via connection 152). In another example, the customer 132 logs-in to their account with the merchant by entering in login credentials into the customer application 139. The customer application 139 can then supply the login credentials to the database server 142 (via connection 149) which uniquely identify the customer 132. In response, the database server 142 may return verification information stored in the database server 142 that is associated with the customer 132 (via connection 149) to the customer application 139. In this example, the verification information in the validation request received from the customer application 139 is obtained by the customer application 139 from the database server 142 and thus the customer 132 is not required to enter the verification information.

In other embodiments, the validation request is received from the database server 142 via connection 148. In these embodiments, in response to receiving login credentials from the web server 150 (via connection 147) or the customer application 139 (via connection 149), the database server 142 may transmit the validation request (comprising verification information stored in the database server 142 that is associated with the customer 132) itself to the data server 124 via connection 148.

The verification information in the validation request could be a phone number associated with their communications device 134, however this is only one example. The verification information in the validation request may correspond to a unique identifier of the first communication session stored in the data cache at step S304. The agent 112 may verbally provide the verification information to the customer 132 during the first communication session. Alternatively, the agent 112 may provide the verification information to the customer 132 via SMS, email or other communication method.

In embodiments, whereby the validation request is sent to the communication server 128, the communication server 128 sends the verification information to the data server 124.

At step S308, the data server 124 queries the data cache 126 with the verification information to determine whether the verification information corresponds with a unique identifier associated with the first communication session that was stored in the data cache at step S304.

The data server 124 then either:
where the verification information is able to be matched to an active communication session, submits a "validation successful" message to the communication server 160;
where the verification information is not able to be matched to a communication session 160, submits a "validation not successful" message to the communication server 160.

In one embodiment, where the agent 112 is utilising CTI application 172 linked to data server 124 via connection 176, it would be possible for dynamic validation to occur during step S308. Dynamic validation occurs where the data server 124 acts as an intermediary device between CTI application 172 and browser 137 (or customer application 139). The data server can trigger a multiple choice question, selection of images, freetext box or other data field for input by the customer 132; this is displayed within browser 137 (or customer application 139). The customer then enters the relevant information or selects the required response. This response is then processed by the data server 124 and displayed to agent 112 within CTI application 172. The agent 112 is then able to confirm the selection to the customer 132 via the first communication session. For example, "I see you have selected the picture of the red car".

At step S310, if the communication server 128 received confirmation from the data server 124 that the verification information was able to be matched to an active communication session, the communication server 128 outputs a validation response indicating successful authentication of the agent 112.

In embodiments whereby the validation request is received from the web server 150, at step S310 the communication server 128 outputs the validation response to the web server 150 causing the display of a message in a webpage of the website of the merchant that indicates that the service agent 112 is a genuine caller acting on behalf of the merchant.

FIG. 5b illustrates an example webpage 510 of a website of a merchant, ABC Inc., which displays a message 512 indicating successful authentication of the agent. It will be appreciated that the validation response indicating successful authentication of the agent that is shown in FIG. 5b is an example only and it may take a different form of text or data.

The validation response indicating successful authentication of the agent may include one or more unique identifier associated with the first communication session that is stored in the data cache 126, such as details of the agent 112 (i.e. name) or time of call and duration. For example, "You are talking to Michelle in the Accounts Team. Your call started at 9.06 am". No personally-identifiable details of the customer 132 are displayed, this prevents a malicious user entering in random phone numbers and receiving personal data on their screen.

In embodiments whereby the validation request is received from the customer application 139, at step S310 the communication server 128 outputs the validation response to the computing device running the customer application 139 (e.g. customer mobile device 138) causing the display of a message in the graphical user interface of the customer application 139 that indicates that the service agent 112 is a genuine caller acting on behalf of the merchant By enabling validation of the outbound call in this way, the customer 132 can gain confidence that they are speaking to an agent who is acting on behalf of the correct business and be confident in disclosing potentially sensitive information.

At step S312, if the communication server 128 received confirmation from the data server 124 that the verification information was unable to be matched to an active communication session, the communication server 128 outputs a validation response indicating unsuccessful authentication of the agent 112.

In embodiments whereby the validation request is received from the web server 150, at step S312 the communication server 128 outputs the validation response to the web server 150 causing the display of a message in webpage of the website of the merchant that indicates that the service agent 112 is not a genuine caller acting on behalf of the merchant.

FIG. 5c illustrates an example webpage 520 of a website of a merchant, ABC Inc., which displays a message 522 indicating unsuccessful authentication of the agent. It will be appreciated that the validation response indicating successful authentication of the agent that is shown in FIG. 5c is an example only and it may take a different form of text or data.

In embodiments whereby the validation request is received from the customer application 139, at step S312 the communication server 128 outputs the validation response to the computing device running the customer application 139 (e.g. customer mobile device 138) causing the display of a message in the graphical user interface of the customer application 139 to indicate that the service agent 112 is not a genuine caller acting on behalf of the merchant Thus in implementations of the present disclosure, the customer 132 receives a phone call from the merchant agent 112. The customer 132, wanting to validate the authenticity of the phone call, utilizes browser 137 or customer application 139, being a website or application made generally available to the customer 132 by the merchant. The customer then clicks a relevant link, or performs such other actions, or an automatic process is triggered, for the validation of the communication. The customer 132 enters information into the validation system (such as phone number, or a unique identifier provided by the agent (which may be via SMS, email or otherwise), or other information which has been stored as part of step S304). The customer will then be provided with confirmation or rejection of the validation of the communication as being a genuine call from the merchant.

In embodiments, validation of the customer's identity may occur in addition to the customer 132 validating the agent's identity. This requires the linking of the CTI application 172 to the data server 124, described above.

As noted above, in certain embodiments of the present invention, the validation process of authenticating the agent 112 may occur within a secure area of the merchant's website or application, following a successful login by the customer 132 to their account with the merchant. Once logged into their account, the customer 132 sees information held by the merchant as obtained from the database server 142. As noted above, the database server 142 will return verification information stored in the database server 142 that is associated with the customer 132 to either the web server 150, the customer application 139 or to the data server 124 (or the communication server 128) via communication channel 148, as part of step S306. The database server 142 is then able to connect to (i.e. establish a link to) the data server 124 (or the communication server 128) via communication channel 148. The customer 132 is able to validate the call from the agent as set out above with reference to FIG. 3.

The link established between the database server 142 and the data server 124 enables the database server 142 to be made aware of the outcome of step S308. Once the validation of the communication received from the service agent 112 has been confirmed at step S310, the agent 112, utilising CRM application 144 (which may be integrated into CTI application 172 or a separate application) is able to access the customer's account using the agent's login credentials. Because the customer 132 has already logged into their account, and the customer account has been linked to the telephony session (by way of the verification information associated with the customer 132 matching with a unique identifier associated with the first communication session that was stored in the data cache), the database server 124 confirms validation of the customer 132's identity to the agent application 144 via connection 146. This negates the need for a customer to provide another method of automatic or manual identification.

In implementations, by using the phone number or a unique code entered into a webpage or application, the phone call (between the agent 112 and customer 132) and a web session are capable of being linked through a central server (e.g. the VDP 120). This makes it is possible to 1) validate that the caller is a representative of the merchant, 2) enable verification of the call recipient to the merchant by requiring them to login to their account, 3) enable co-browsing of the website between the agent and customer. As described in the applicant's U.S. Pat. No. 10,270,865 a central data platform such as the VDP 120 may mediate communications between the merchant website and both the customer and agent browsers. In this case, co-browsing is possible. Depending on the required level of input from customer and/or agent, co-browsing is possible in a number of different scenarios: view-only by agent, view-and-control by agent, view-only by customer, etc.

In some implementations, (1) a phone call is made by an organization ("X"), or a contact center working on their behalf, to a customer ("Y"); (2) a record of the call is added to a data store, which may include details such as the name of the individual making the call, the phone number dialled, an automatically or manually generated unique reference number, start time of phone call, ongoing duration of phone call or any other information deemed appropriate by organization X; (3) on receipt of the phone call, where individual Y requests to validate the authenticity of the phone call, organization X can direct the individual Y to, for example, organization X's publicly available website homepage; (4) on organization X's website homepage, the individual Y is able to click a hyperlink referencing the validation of a received call; (5) the individual Y enters the phone number which has been dialled (or the unique reference number, or other defined information which is included in the log at (2) above); (6) the information entered by individual Y is cross-referenced against information contained in the data store; (7a) if the cross-referencing has validate the telephone call, a message is displayed on the webpage to the individual Y confirming that the phone call they have received is valid and the individual Y can then continue the conversation having confirmed that they are conversing with organization X; (7b) if the cross-referencing is unable to validate the information entered by individual Y against the data store, a message will be displayed on the webpage indicating that validation has not been successful.

Such an approach enables individual Y to gain confidence that they are speaking to a representative of organization X and enables fraudulent calls to be identified and terminated by individual Y.

The individual Y could be directed to an application on a mobile device or integrated software on a device rather than to a website. Rather than accessing a link, the individual Y could log in to their account with organization X via the website, application or software. Once logged in, there may be an option to check for the validity of a call, which could include entering a phone number or other data stored on the data store, or could be an automatic check based on personal details held within the individual Y's account.

If the solution requires the individual Y to access their account with organization X, this could enable verification of the individual Y with the contact center agent ("Z") making the phone call on behalf of organization X. This may be achieved through additional logging of information within the data store, which can then be cross referenced by the contact center agent Z to confirm that the individual Y has entered their secure credentials during the telephone call.

Where it is not possible to route calls through, or automatically record data associated with a phone call to, a data store, the contact center agent Z could confirm the details of a call they are about to make on a portal available on a computing device. This would update the data store to enable the validation checks to take place.

The validation through a data store can enable dynamic fields to be entered and simultaneously received between the parties. This enables additional validation exercises to be carried out. For example, once the customer enters their details for validation, they could be presented with four pictures; for example an elephant, a lion, a monkey and a zebra. Individual Y would be asked to select one picture by clicking on it. Once this has been done, the contact center agent Z would receive a notification on their computing device of the selection made by individual Y, which can then be confirmed over the telephone call voice channel.

Where the individual Y has logged into their account with organization X in order to validate the phone call, a co-browsing web session may be commenced, enabling contact center agent Z to update details in the individual Y's account, such as adding items to a shopping basket.

The described embodiments can be incorporated into a specific hardware device, a general purpose device configured by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment could include an application specific device such as an ASIC, an FPGA or a DSP, or other dedicated functional hardware means. The reader will understand that none of the foregoing discussion of embodiment limits future implementation of the invention on yet to be discovered or defined means of execution.

The invention has been described above with reference to specific embodiments. Persons skilled in the art, however, will understand that various modifications and changes may be made thereto without departing from the broader scope of the invention as set forth in the appended claims. The foregoing description and drawings are, accordingly, to be regarded in an illustrative rather than a restrictive sense.

The invention claimed is:

1. A method of authenticating a service agent on behalf of a user, the method performed at one or more servers and comprising:
   obtaining at least one unique identifier that is uniquely associated with a first communication session between the service agent and the user, the first communication session established over a first communication channel;
   storing the at least one unique identifier in a data store;
   receiving, via a second communication channel, a validation request comprising verification information associated with the user;
   attempting authentication of the service agent by comparing the verification information with the at least one unique identifier stored in the data store, and in response outputting a validation response via the second communication channel;
   wherein, if the verification information corresponds with the at least one unique identifier stored in the data store, the validation response indicates successful authentication of the service agent, and if the verification information does not correspond with the at least one unique identifier stored in the data store, the validation response indicates unsuccessful authentication of the service agent.

2. The method of claim 1, wherein the first communication session is initiated by a telephone associated with the service agent.

3. The method of claim 1, wherein the first communication session is initiated by a computing device associated with the service agent.

4. The method of claim 1, wherein the validation request is received from a web server hosting a website of a merchant that is associated with the service agent, the verification information entered into the website by the user.

5. The method of claim 1, wherein the validation request is received from a web server hosting a website of a merchant that is associated with the service agent, the verification information having being obtained by the web server by querying a database server in response to the user logging to into the website.

6. The method of claim 4, wherein the validation response is output to the webserver for displaying a message on the website conveying the successful authentication of the service agent.

7. The method of claim 1, wherein the validation request is received from an application of a merchant that is associated with the service agent installed on a computing device associated with the user.

8. The method of claim 7, wherein the validation response is output to the computing device associated with the user.

9. The method of claim 1, wherein the first communication session between the service agent and the user is routed via the one or more servers, the method comprising obtaining the at least one unique identifier by analyzing data exchanged in the first communication session.

10. The method of claim 1, wherein obtaining the at least one unique identifier comprises receiving the at least one unique identifier from a computing device associated with the service agent.

11. The method of claim 1, wherein the unique identifier comprises at least one of: (i) a telephony session identifier assigned to the first communication session; (ii) a timestamp indicating when the first communication session was established; (iii) a phone number associated with the user; (iv) information associated with the service agent; (v) information associated with the device used to initiate the first communication session; and (vi) information entered manually by the service agent.

12. The method of claim 1, wherein the unique identifier comprises an alphanumeric code.

13. The method of claim 1, wherein the validation response comprises one or more of: information associated with the service agent, a time when the first communication session was established, and a duration of the first communication session.

14. The method of claim 1, wherein the first communication session is a voice call.

15. The method of claim 1, wherein the second communication channel is over a packet-based network.

16. A computer program product for authenticating a service agent on behalf of a user, the computer program product comprising instructions embodied on a non-transient computer-readable medium and configured so as when executed on a processor of at least one server to perform the method of claim 1.

17. A server for authenticating a service agent on behalf of a user, the server comprising a processing apparatus configured to:
  obtain at least one unique identifier that is uniquely associated with a first communication session between the service agent and the user, the first communication session established over a first communication channel;
  store the at least one unique identifier in a data store;
  receive, via a second communication channel, a validation request comprising verification information associated with the user;
  attempt authentication of the service agent by comparing the verification information with the at least one unique identifier stored in the data store, and in response output a validation response via the second communication channel;
  wherein if the verification information corresponds with the at least one unique identifier stored in the data store the validation response indicates successful authentication of the service agent, and if the verification information does not correspond with the at least one unique identifier stored in the data store the validation response indicates unsuccessful authentication of the service agent.

* * * * *